United States Patent
Taylor

[11] 3,866,633
[45] Feb. 18, 1975

[54] HOSE STRUCTURE
[75] Inventor: Challen E. Taylor, Waukegan, Ill.
[73] Assignee: The Goodyear Tire and Rubber Company, Akron, Ohio
[22] Filed: June 7, 1973
[21] Appl. No.: 367,997

[52] U.S. Cl. ............................... 138/130, 138/138
[51] Int. Cl. ............................................. F16l 11/08
[58] Field of Search ........... 138/138, 172, 153, 126, 138/127, 137, DIG. 2, 118, 129, 130

[56] References Cited
UNITED STATES PATENTS

| | | | |
|---|---|---|---|
| 1,668,560 | 5/1928 | Healy | 138/137 |
| 2,173,359 | 9/1939 | Freelander | 138/138 |
| 2,393,496 | 1/1946 | Stedman | 138/126 |
| 2,577,205 | 12/1951 | Meyer et al | 138/DIG. 2 |
| 3,062,242 | 11/1962 | Vanderbilt | 138/DIG. 2 |
| 3,071,162 | 1/1963 | Mick | 138/153 X |
| 3,287,315 | 11/1966 | Connor et al | 138/137 UX |
| 3,599,677 | 8/1971 | O'Brien | 138/137 X |
| 3,669,784 | 6/1972 | Yokota et al | 156/306 X |

*Primary Examiner*—Jerry W. Myracle
*Attorney, Agent, or Firm*—F. W. Brunner; R. P. Yaist

[57] ABSTRACT

A flexible reinforced hose and a combination of the hose and connecting means therefor. The hose has an innermost portion formed of a tubular member including a multiplicity of lengths of short filaments of flexible relatively inert material randomly dispersed throughout the material of the tubular member to provide strength and heat resistance. The hose of the invention has an increased ability to retain fittings or couplings.

13 Claims, 6 Drawing Figures

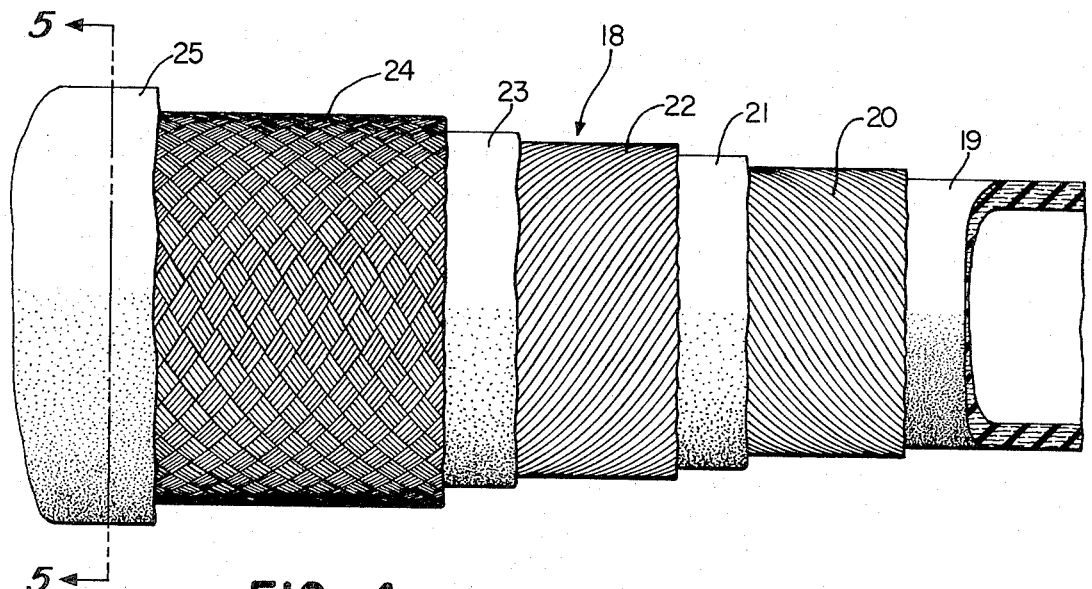
FIG. 4
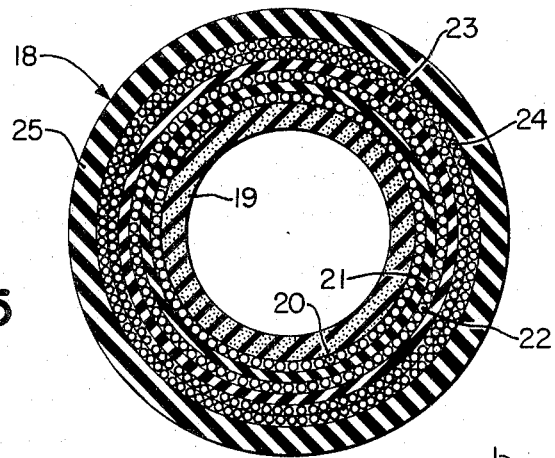
FIG. 5
FIG. 6
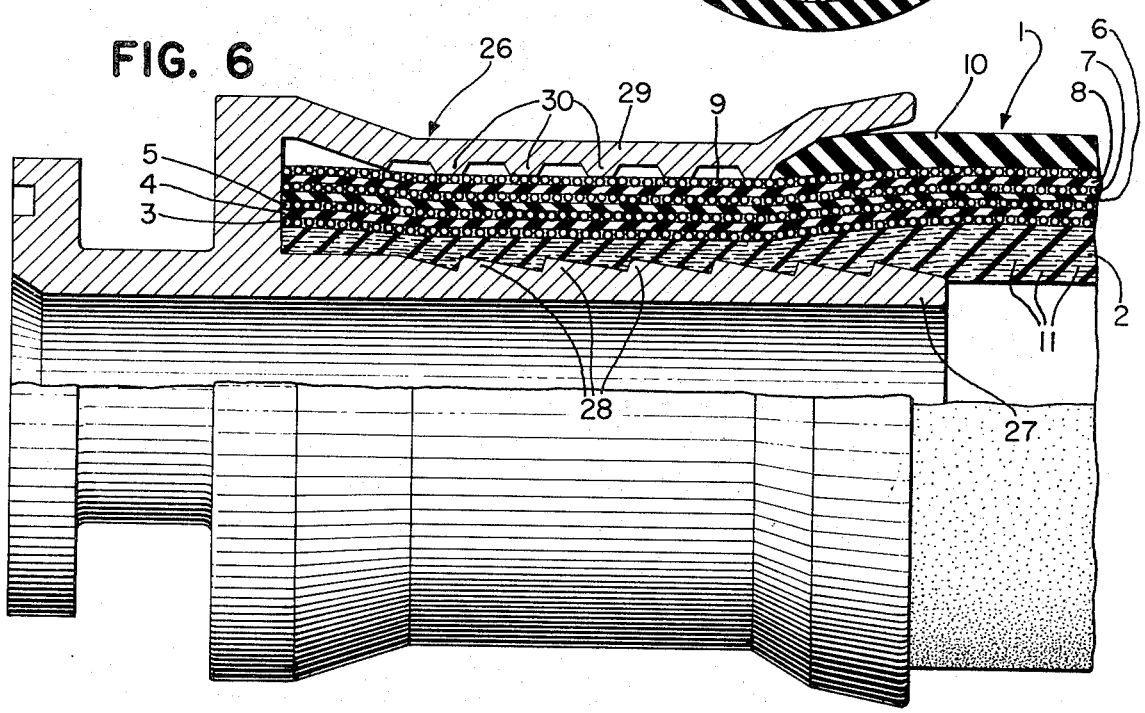

HOSE STRUCTURE

BACKGROUND OF THE INVENTION

This invention relates to a hose structure and more particularly to a flexible reinforced hose for use with rigid connecting means such as couplings and fittings. The invention even more particularly relates to a wire reinforced high pressure hose having an improved construction to increase its ability to retain hose fittings or couplings under severe operating conditions.

Customarily, high pressure hose is wire reinforced hose as exemplified by Haas U.S. Pat. No. 3,212,528. Typically, this type hose is constructed having a cylindrical tube or core of relatively soft, rubber or other elastomeric material which is wrapped or covered with a protective fabric tape, spiral or braid to protect the tube from damage when the first ply of wire is wound on the core. Insulating layers of uncured elastomer are disposed between the fabric and first wire ply and all subsequent wire plies. An outer wear-resistant layer of rubber is subsequently applied to cover the radially outermost wire ply and the various hose components are vulcanized to form a hose of integral construction.

Those skilled in the art are aware that one problem encountered with such hose to be used with rigid connecting means such as couplings and fittings is the inability of the hose to retain the coupling or fitting which is attached to the end of the hose cover and tube. This problem has become particularly acute as test and service conditions become increasingly severe due to advanced operating temperatures and pressures. For example, the hose tube may soften with an increase in heat, thereby losing its ability to retain the rigid connecting means. In addition, the extruded tube has had insufficient strength in a direction parallel to the longitudinal axis of the hose to withstand severe end thrust to which the hose may be subjected. An additional problem with the wire reinforced high pressure hose structure described above is the added expense of manufacturing the hose caused by the necessity of providing the protective fabric layer over the extruded tube.

In the prior art, Grawey, et al., U.S. Pat. No. 3,357,456 discloses a flexible high pressure wire reinforced hose having an inner tube or core formed from a laminated tape of an open mesh fabric sandwiched between two layers of uncured elastomer which is wound spirally in an overlapping relationship on a mandrel. Subsequently, a series of wire plies with uncured layers of elastomer between adjacent wire plies are wound around the hose tube with this assembly then being vulcanized to form an integral composite hose structure. This construction has proven to be satisfactory when used with a coupling for which the hose has been especially designed. However, the hose disclosed in Grawey, et al., has not been in general use. In addition, since the Grawey et al. hose must be built upon a rigid mandrel usually having a length of about 60 feet, it is not suited for the manufacture of long length hose, for example, made in a length of several hundred feet. Furthermore since the inner tube is of a wrapped construction formed by a calendering operation, it is obviously less uniform or homogeneous than an extruded tube and consequently possibly less fluid-impervious.

It is therefore desirable to provide a hose with an extruded tube which will overcome the disadvantages of the prior art. The present invention provides such a hose which will be hereinafter described.

OBJECTS OF THE INVENTION

It is a primary object of the present invention to provide a hose construction which will have a greater ability to retain hose fittings and couplings and resist fitting blow-off.

It is another important object of the present invention to provide a flexible reinforced hose having an extruded tube composed of uniform, high strength and heat-resistant material which will resist end thrusts and be resistant to high temperatures during use.

It is another object of the present invention to provide a flexible reinforced hose structure available in long lengths which is suitable for use in combination with hose couplings and fittings.

It is another object of the present invention to provide an improved hose structure for use in combination with a variety of types of couplings or fittings.

It is a still further object of the present invention to provide a flexible wire reinforced, high pressure hose having an inner tube which does not require a protective layer of material immediately surrounding the tube.

Other objects and advantages of this invention will become apparent hereinafter as the description thereof proceeds, the novel features, arrangements and combinations being clearly pointed out in the specification as well as the claims thereunto appended.

In accordance with the present invention, the above objects and advantages are achieved by a flexible reinforced hose of integral construction comprising an inner tubular member of flexible polymeric material extending longitudinally of the hose to form the innermost portion thereof with the tubular member including a multiplicity of lengths of short filaments of flexible, relatively inert material randomly disposed throughout the material of the tube to provide the tube with longitudinal strength and heat resistance.

Preferably a majority of the filaments of the flexible material are oriented generally in a direction parallel to the longitudinal axis of the hose.

The flexible filamentary material is of the type described in Taylor, et al., U.S. Pat. No. 3,190,315. This patent discloses a hose subjected to relatively high pressures which includes a layer of lengths of short filaments of flexible material between spaced reinforcing layers for the purpose of preventing these layers from contacting each other during expansion and contraction of the hose and to eliminate or reduce the relative movement of the reinforcing layers when subjected to pulsating loads caused by operating pressure conditions. This reference does not disclose or suggest the use of such materials in the inner tube or core of the hose.

BRIEF DESCRIPTION OF THE DRAWINGS

In the drawings:

FIG. 4 is an elevational view of another form of the invention shown in FIG. 1;

FIG. 5 is a section taken on line 5—5 of FIG. 4;

FIG. 6 is an elevational view showing the hose of the present invention in combination with a coupling illustrating a preferred use of the invention.

DESCRIPTION OF THE PREFERRED EMBODIMENTS

Figure 1:
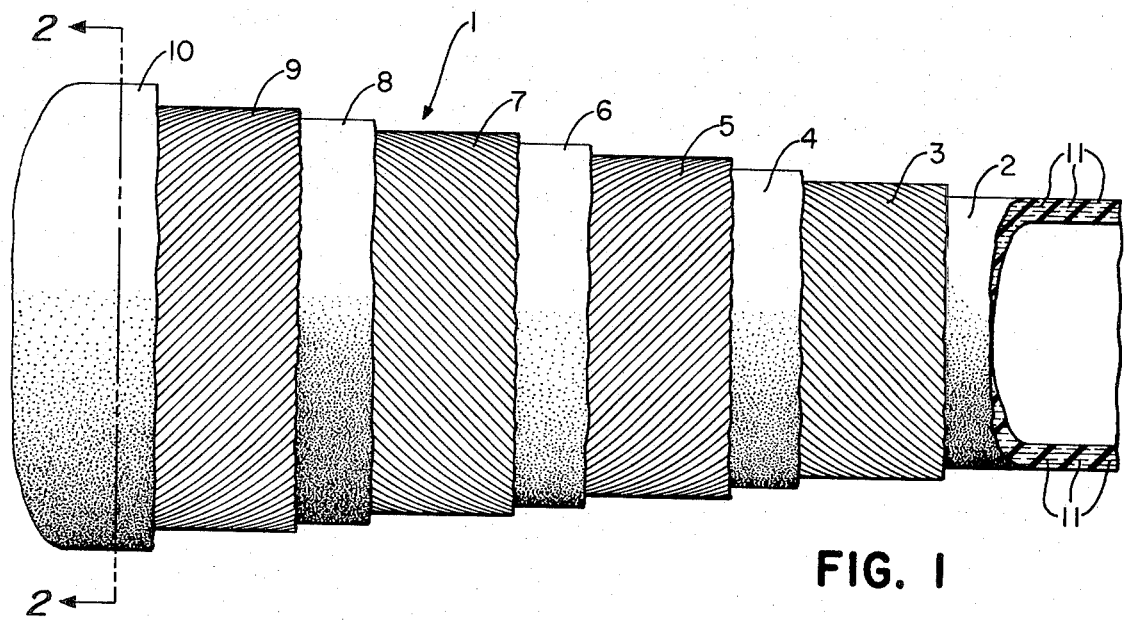
FIG. 1 is an elevation of a portion of the hose of the present invention with parts being broken away.
Figure 2:
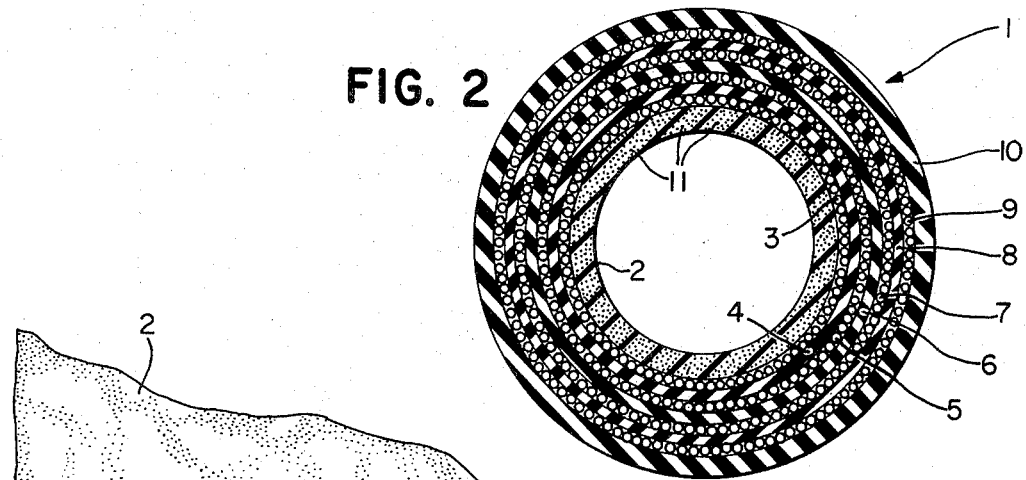
FIG. 2 is a section taken on line 2—2 of FIG. 1.

In FIGS. 1 and 2 the hose structure 1 of the invention is shown which in this case is illustrated as a high pressure, wire reinforced hose. The hose 1 includes an inner tubular member 2 extending longitudinally thereof throughout its extent to form the innermost portion or core thereof. The inner tubular member or tube 2 is comprised of a flexible polymeric material such as a fluid-impervious natural or synthetic elastomer. The tube 2 is surrounded by a reinforcing layer 3 of spirally wound metallic wire and as illustrated, also includes alternating successive layers of insulating elastomeric material 4, 6 and 8 and additional spirally wound wire layers 5, 7 and 9. The insulating layers also serve to bind the wire layers together in the hose structure 1. A cover 10 of wear or scuff-resistant material such as a natural or synthetic elastomer surrounds and encases the radially outermost wire layer 9 to complete the hose structure 1.

The inner cylindrical tube 2 includes a multiplicity of lengths of short filaments 11 of flexible relatively inert material randomly disposed throughout the material of the tube 2 to provide strength and heat resistance. The filaments 11 may be of any flexible material such as textile, metallic, glass, plastic, cellulosic, ceramic, etc and are formed preferably from short lengths of fibers, strands, monofilaments, yarns, etc of the aforementioned materials. For example, staple textile fibers composed of nylon have been found to be very satisfactory for this purpose. The filaments or fibers 11 preferably have a maximum length of about one-half of an inch and may typically be from about ¼ to about ⅜ of an inch long.

Figure 3:
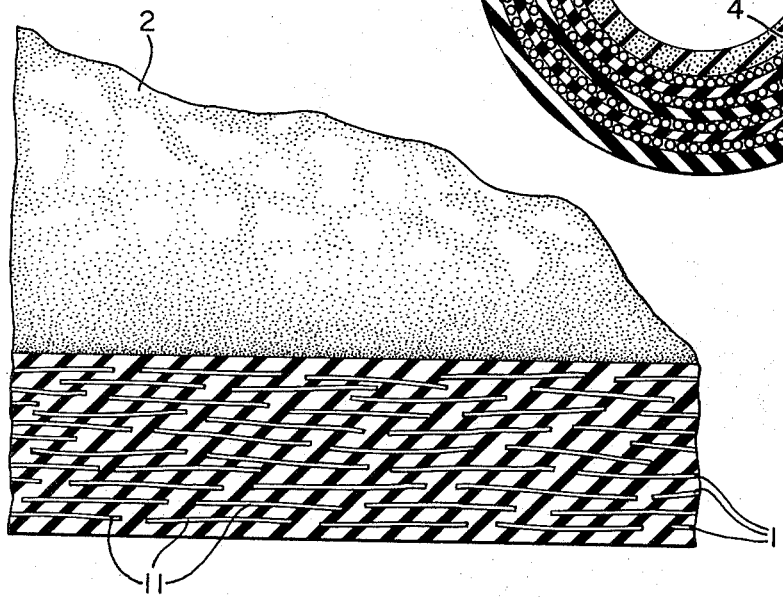
FIG. 3 is an enlarged elevational view partial in section showing the inner hose tube of the invention shown in FIGS. 1 and 2.

It is preferred that a majority of the individual flexible filaments 11 be oriented in a direction parallel to the longitudinal axis of the hose 1 as is best shown in FIG. 3. In this way, maximum strength in the longitudinal direction will be provided thereby enabling the tube 2 to withstand relatively high end thrust during operation. The tube 2 is preferably formed by extruding on conventional equipment for that purpose. During the extrusion procedure, the fiber loaded polymeric compound which will form the tube is extruded through the tuber head and pin/die orifice. The resulting shear planes align the individual fibers 11 in a position basically parallel to the center line of the extrusion. Consequently, the individual filaments or fibers 11 are molded into the tube compound as an inert, high structural strength internal reinforcement disposed in a position to best resist high end thrust forces. Since the tube is extruded, it may be produced on flexible mandrels thus allowing the manufacture of relatively long length hose. The tube may also be extruded and positioned over a rigid steel mandrel and braided with one or more layers of reinforcing material.

If desired, the tube may be produced on a rigid mandrel with the fiber-loaded tube compound being initially calendered to orient the fibers in a generally longitudinal direction during the calendering operation. Subsequently, the calendered fiber-loaded stock may be spirally wrapped on the rigid mandrel to form the inner core or tube of the hose.

It is preferred that the fibers or filaments 11 be treated with a suitable bonding agent prior to being incorporated into the elastomeric material of the tube. The specific type bonding agent will, of course, depend upon the kind of filaments being used. The filaments 11 will then include a coating of the bonding agent on their exterior surface in order to effect adhesion between the filaments 11 and the material of the tube 2. Alternatively, the filaments may be untreated and the elastomeric material of the tube may include a bonding agent incorporated therein to effect adhesion between the filaments and the material of the tube. It has been found, for example, that a tube composed of nitrile rubber including a multitude of short lengths of staple nylon fibers produces a very satisfactory inner tube for the hose of the present invention.

In making the hose 1 of the present invention after the inner tubular member 2 has been formed, the radially innermost wire layer 3 may be applied directly over the high strength tube 2 without the necessity of providing a fabric tape or braid for protection as was customary in the prior art. Alternating insulating layers 4, 6 and 8 of unvulcanized elastomeric material and spirally wound wire reinforcing layers 5, 7 and 9 are subsequently applied in sequence with the outer elastomeric cover 10 completing the hose assembly.

The entire composite structure of the hose 1 after forming is then subjected to heat and pressure to unite the various components into an integral and unitary structure in accordance with any of the usual well-known methods.

Of course other hose structures are possible. For example, one or more plies or layers of reinforcing wire may be replaced by braided strands of flexible, metallic material. As is shown in FIGS. 4 and 5, the hose 18 having a fiber-reinforced tube 19 and alternating spirally wound layers 20 and 22 and insulating elastomeric layers 21 and 23 may have an outermost reinforcing layer or ply 24 formed of a braided construction rather than a layer of spirally wound wire material of the type shown in FIGS. 1 and 2. The hose 18 also includes an outer elastomeric cover 25.

It is to be understood that many other type hose structures are possible, for instance in which textile fabric or reinforcement in either cord or square-woven form make up one or more reinforcing plies in the hose construction.

The hose of this invention is constructed to be used with rigid elements associated with the end of the tubular member which, for example, may be connecting means such as couplings or fittings engaging the hose tube in a close intimate relationship.

FIG. 6 illustrates a typical use for the hose 1 of this invention in combination with a coupling assembly. The coupling 26 is crimped onto the end of the hose 1 and includes an elongated stem or nipple 27 extending into the bore of the tube 2. The nipple 27 includes a series of circular ribs or teeth 28 provided on its outer surface which are embedded in the inner peripheral surface of the tube 2. The coupling 26 also includes s shell 29 which surrounds the outer peripheral surface of the end of the hose 1. As shown in FIG. 6, the cover 10 may be stripped back from the end of the hose to expose the radially outermost layer 9 of reinforcement and is preferably skived under the end of the shell 29. The shell 29 also includes a plurality of teeth 30 provided on its inner peripheral surface which when the shell is crimped, bear against the outer layer 9 of reinforcing material to further insure retention of the coupling 26 on the hose 1.

The fiber-loaded hose tube has the high strength and inertness necessary for long service life under severe operating conditions of advanced temperatures and pressures. The increased structural strength of the tube will resist fitting blow-off but yet is sufficiently flexible to move radially and form the necessary seal between the tube and the fitting or coupling.

It should be recognized by those skilled in the art that the hose structure of this invention is suitable for use with a variety of different type couplings and fittings. Therefore the particular assembly shown in FIG. 6 is merely illustrative of a typical assembly and is not meant to be limiting.

It should also be recognized that the present invention provides a hose structure suitable for retaining hose couplings and fittings which may be provided in long lengths.

While certain representative embodiments and details have been shown for the purpose of illustrating the invention, it will be apparent to those skilled in the art that various changes and modifications may be made therein without departing from the spirit or scope of the invention.

We claim:

1. A flexible wire reinforced hose of integral construction adapted to resist high pressure, said hose comprising an inner tubular member of flexible polymeric material extending longitudinally of the hose to form the innermost portion thereof at least two spaced reinforcing layers comprised of a plurality of closely spaced spirally wound flexible metallic wire elements disposed around said tubular member, and an insulating layer disposed between the said reinforcing layers with the innermost reinforcing layer in direct contact with and directly supported by the outer peripheral surface of said tubular member to provide reinforcement for the hose and with said wire elements having a small cross-sectional dimension in relation to the wall thickness of said tubular member, said tubular member including a multiplicity of lengths of short filaments of flexible relatively inert high structural strength material randomly disposed throughout the material of the tubular member and oriented generally in direction parallel to the longitudinal axis of the hose to provide strength and heat resistance.

2. The hose as claimed in claim 1 wherein said filaments include a coating of a bonding agent on the exterior surface thereof to effect adhesion between the filaments and the material of the tubular member.

3. The hose as claimed in claim 1 wherein said filaments are untreated and said tubular member is comprised of an elastomeric material including a bonding agent incorporated therein to effect adhesion between the filaments and the material of the tubular member.

4. The hose as claimed in claim 1 wherein said filaments are comprised of staple textile fibers.

5. The hose as claimed in claim 4 wherein said fibers are composed of nylon.

6. The hose as claimed in claim 1 wherein rigid means is connected to said tubular member.

7. In an integral hose structure for carrying fluid under pressure including a fluid impervious inner layer of elastomeric material, alternating successive layers comprised of insulating elastomeric material and closely spaced spirally wound metallic wire material of small diameter surrounding said inner layer, and an outer layer of elastomeric material encasing the said inner layer and said reinforcing and insulating layers, the improvement wherein the innermost layer of said wire material is directly applied to and directly supported by said inner layer and said inner layer includes a plurality of lengths of short filaments of relatively inert flexible high structural strength material randomly dispersed therein and oriented generally in a direction parallel to the longitudinal axis of the hose to form a substantially homogeneous layer which will resist movement of said inner layer in a longitudinal direction when subject to outside forces and will support said wire material without damage thereto.

8. The improvement as claimed in claim 7 wherein at least one of said reinforcing layers is comprised of braided strands of flexible metallic material.

9. In combination, a flexible wire-reinforced hose and a connecting means therefor attached at the end of the hose, said hose being of integral construction comprising an inner tube of flexible polymeric material extending longitudinally of the hose to form the innermost portion thereof which is engaged by said connecting means and at least two spaced reinforcing layers comprised of a plurality of closely spaced spirally wound flexible metallic wire elements surrounding said tube, an insulating layer of flexible polymeric material disposed between the said reinforcing layers and a cover layer of flexible polymeric material surrounding the outermost reinforcing layer with the innermost reinforcing layer in direct contact with and directly supported by said tube and with said wire elements having a small cross section in relation to the wall thickness of said tube, said tube including a multiplicity of lengths of short filaments of flexible relatively inert high structural strength material having a maximum length of about one-half of an inch and typically having a length of from about ¼ to about ⅜ of an inch, said flexible material randomly disposed in said inner layer and oriented generally in a direction parallel to the longitudinal axis of the hose to provide the tube with longitudinal strength and heat resistance thereby enabling the hose to retain said connecting means.

10. The combination as claimed in claim 9 wherein at lest one of said reinforcing layers is comprised of braided strands of flexible metallic material.

11. The combination as claimed in claim 9 wherein a layer of elastomeric material surrounds the radially outermost reinforcing layer.

12. The combination as claimed in claim 11 wherein said connecting means is a coupling including an elongated nipple extending into the bore of said tube and a shell surrounding the outer peripheral surface of the end portion of said hose with said nipple and said shell in intimate engagement with the end portion of said hose.

13. The combination as claimed in claim 12 wherein said nipple includes a plurality of teeth provided on its outer peripheral surface which are embedded in the inner peripheral surface of the tube and said shell includes a plurality of teeth provided on its inner peripheral surface which bear against the outermost reinforcing layer.

* * * * *